United States Patent [19]

Duncan

[11] Patent Number: 4,523,260

[45] Date of Patent: Jun. 11, 1985

[54] STAR DISPLAY

[76] Inventor: Freda Duncan, P.O. Box 531, Elkton, Oreg. 97436

[21] Appl. No.: 578,312

[22] Filed: Feb. 10, 1984

Related U.S. Application Data

[63] Continuation of Ser. No. 293,149, Aug. 17, 1981, abandoned.

[51] Int. Cl.$^3$ ............................................. F21P 1/02
[52] U.S. Cl. .................................... 362/121; 362/252;
    362/807; 428/11; 403/205; 403/403; D11/125
[58] Field of Search ............... 248/175, 127, 1, 163 R,
    248/165, 188.1; 362/121, 807, 252; 428/11, 27,
    594, 598, 603; D11/121, 124, 125, 70, 108;
    D26/156; 40/442–444; 403/217, 205, 206, 403,
    382; D9/331; D20/36; D92/1 FF

[56] References Cited

U.S. PATENT DOCUMENTS

| | | | |
|---|---|---|---|
| 1,543,424 | 6/1925 | Cowles | 362/807 X |
| 2,183,326 | 12/1939 | Thaeler | 362/807 X |
| 2,191,041 | 2/1940 | Protz | 428/11 X |
| 2,201,201 | 5/1940 | Protz | 428/11 |
| 2,894,345 | 7/1959 | Bushnell | 362/121 |
| 2,912,013 | 11/1959 | Freyholdt et al. | 403/382 X |
| 3,182,186 | 5/1965 | Faulk | 362/812 |
| 3,184,366 | 5/1965 | Claude | 362/807 X |
| 3,272,976 | 9/1966 | Charchan et al. | 362/121 |
| 3,400,263 | 9/1968 | Yakim | 428/11 X |
| 3,704,367 | 11/1972 | Korg | 362/121 |
| 3,828,182 | 8/1974 | Semonovich | 362/121 |

FOREIGN PATENT DOCUMENTS

| | | | |
|---|---|---|---|
| 151494 | 10/1981 | German Democratic Rep. | 362/121 |
| 1425707 | 2/1976 | United Kingdom | 362/807 |

Primary Examiner—Stephen C. Bentley
Assistant Examiner—John S. Maples
Attorney, Agent, or Firm—Roland H. Shubert

[57] ABSTRACT

An ornamental star display device adapted for use with strands of decorative electric lights having clip attachment means. The star is formed of a plurality of identical point members each of which is formed in the shape of an open-base triangle having sides terminating in outwardly extending leg portions. Brace members, one for each point member, form the base of each triangular point member when the display device is assembled. Fastening means securely hold a brace end and a leg portion in a parallel, superposed relationship with a side of each point member to form a rigid display device capable of easy assembly and disassembly.

3 Claims, 5 Drawing Figures

STAR DISPLAY

This application is a continuation of application Ser. No. 293,149, filed Aug. 17, 1981, now abandoned.

BACKGROUND OF THE INVENTION

This invention related generally to ornamental display devices.

More particularly, this invention relates to an ornamental star-shaped device adapted for use with strands of decorative lights, of simple manufacture, and capable of being easily assembled and disassembled.

Star-shaped ornamental devices are commonly and traditionally used as exterior decorative objects during certain religous holidays, particularly at Christmas. Decorations of this sort tend to be rather bulky and hence are difficult to store from one season to the next. There have been proposed a number of different types of lighted, decorative star displays but many are of complex construction, costly to manufacture and difficult to assemble and disassemble. Lighted, star-shaped decorative devices known in the prior art include those described in U.S. Pat. Nos. 2,894,345; 3,184,366; 3,272,976 and 3,704,367.

SUMMARY OF THE INVENTION

An ornamental star display adapted for the attachment of decorative electric light strands by means of the clips normally provided on such lights comprises a plurality of identical point members and a corresponding number of identical brace members. The point members and brace members are preferably fabricated from either metal or plastic strapping or strip material. Each point member is in the form of an open-base triangle with at least one outwardly extending leg portion. The brace members in an assembled position form the base of each point member triangle and have a straight central position with ends bent or turned inwardly at an angle so as to be parallel with the sides of the point members. The point members and brace members are assembled with a brace end and point member leg portion in a parallel, superposed relationship with the side of a point member and are firmly held in that position by fastening means which may comprise screws, bolts and the like.

Hence, it is an object of this invention to provide a star-shaped display device.

It is another object of this invention to provide a display device of simple manufacture capable of ready assembly and disassembly for ease in transport and storage.

BRIEF DESCRIPTION OF THE DRAWING

The drawing includes FIGS. 1 to 5 wherein.

DESCRIPTION OF PREFERRED EMBODIMENTS

Figure 1:
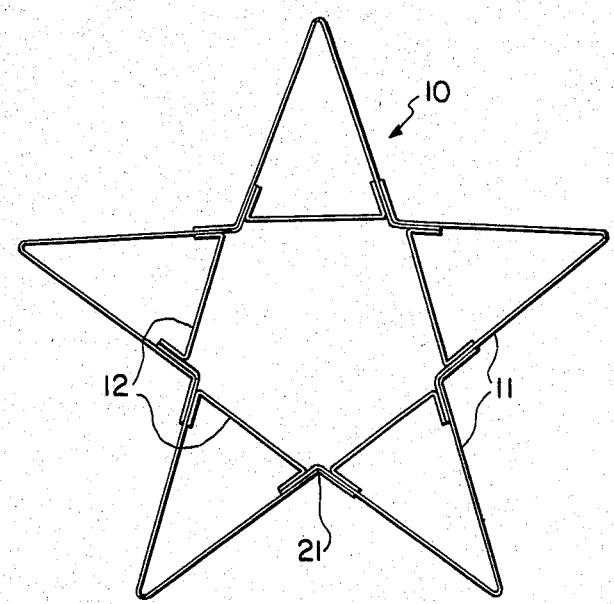
FIG. 1 is a front view showing a star display in assembled configuration.

Referring to the drawing where like reference numerals refer to similar parts throughout the figures, there is shown in FIG. 1 a view of star display 10 in assembled configuration.

Figure 2:
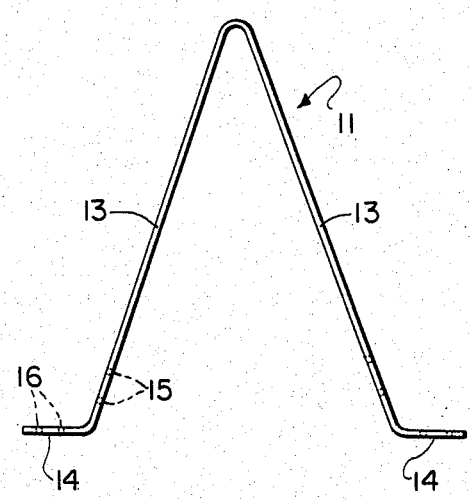
FIG. 2 is a detail view of a single point member.
Figure 3:
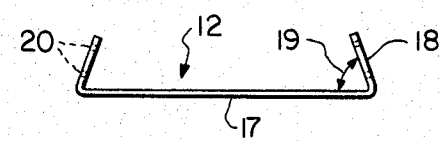
FIG. 3 is a detail view of a single brace member.

Star display 10 includes a plurality of point members 11, preferably either five or six in number, and a corresponding number of brace members 12. As is best shown in FIGS. 2 and 3, point members 11 and brace members 12 are fabricated of flat strap material having sufficient stiffness to provide rigidity to the assembled device. Appropriate materials of construction include metals, particularly aluminum, and heat formable plastics.

Point member 11 is formed in the shape of an open-base triangle having a pair of equal sides 13. At least one, and preferably both, sides 13 terminate in an outwardly pointing leg portion 14. In a preferred embodiment, each triangle side has, at a location adjacent to its open end, a pair of drilled or punched holes 15 for accommodation of fastening means which conveniently may comprise a bolt or the like. Likewise, each leg portion 14 has a corresponding pair of drilled or punched holes 16 conforming in size and spacing to holes 15. All point members 11 are identical one with another.

Brace members 12 comprise a central straight portion 17 having inwardly turned ends 18 forming an angle 19 with portion 17. Angle 19 is set so as to result in brace ends 18 being parallel to sides 13 of point member 11 when member 12 is in assembled relationship and forming the base of member 11. Each base member 12 has drilled or punched in each brace end a pair of holes 20 conforming in size and spacing to hole pairs 15 and 16. All brace members 12 are individually symmetrical in form, are identical one with another, and are equal in number to point members 11.

Figure 4:
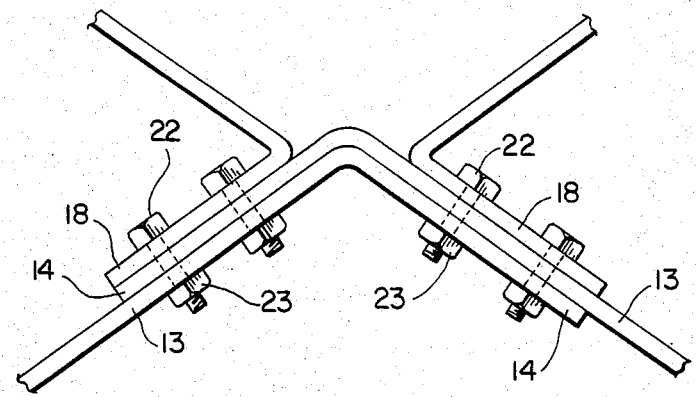
FIG. 4 is an expanded view showing the assembled relationship of the point members and brace members together with fastening means.

Turning now to FIG. 4, there is shown an expanded view of the point members and brace members in an assembled and secured position. The Figure shows a single junction point, corresponding to point 21 of FIG. 1, at which two point members and two brace members are secured in a rigid relationship. The two point members 11 are assembled such that the leg portion 14 of one point member is parallel to and superposed on a side 13 of the other point member with the hole pairs of the respective members in an indexed position. Superposed over each side-leg portion pair is a brace end 18 with its hole pair 20 in an indexed position relative to the hole pairs of the other two members. Fastening means, which preferably comprises a bolt 22 and nut 23, are inserted through the indexed holes to secure the members in a rigid, alignment.

The brace members and point members are preferably constructed of a flat strap material having a thickness on the order of one-sixteenth to one-eighth inch and a width typically ranging from about one-half to one inch. Overall dimension of the star ornament will typically range from about two to four feet measured between opposite points. These dimensions are, of course, not critical and star ornaments of both smaller and larger dimension can readily be fabricated. Both point members and brace members, because of their symmetry and identical size, can be nested one within the other in an unassembled state for ease and economy of shipment.

Figure 5:
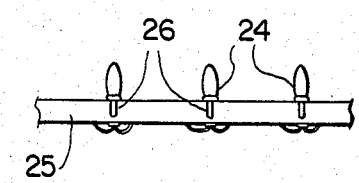
FIG. 5 illustrates a portion of the display device having associated therewith a plurality of decorative electric lights.

As is illustrated in FIG. 5, the flat, thin strap material used in the construction of both point and brace members provides an ideal mounting for decorative electric light strands having clip attachment means. Lights 24 are attached to member portion 25 by means of clips 26 associated with each light. Member portion 25 may comprise either the straight portion 17 of a brace member or a side 13 of a point member.

The drawing Figures depict one preferred embodiment of this invention. In alternative embodiments point members 11 may include but one leg portion 14. A single bolt fastener 22 may be utilized as may other types of fastening means including for example a compressive sleeve. Brace members 12 may be assembled with inwardly turned ends 18 pointing toward the display center provided that angle 19 is set to insure parallelism of the brace ends with the sides of the point member in this orientation.

From the foregoing description, it will be seen that this invention provides a display device which is practical and economic in construction and which can be assembled and disassembled with ease. While only preferred forms of the invention have been illustrated and described, other forms and embodiments will be apparent to those skilled in the art.

I claim:

1. A uniplanar star which comprises;
   a plurality of identical point members formed of an opaque strap material, each said member in the shape of an open-base triangle having two sides with an outwardly extending leg at the terminus of each said side, said point members having mounted thereon a plurality of decorative lights, each said point member having a pair of holes in each of said leg portions and in each of said sides, said hole pairs for receiving fastening means therethrough;
   a plurality of identical brace members, one for each point member, formed of a flat strap material and having a straight central portion with inwardly turned ends, each of said brace member ends having a pair of holes indexable with the hole pairs in said point members; and
   fastening means insertable through indexed hole pairs of a point member side, a point member leg portion and a brace member end to hold said members in a rigid, parallel, superposed attitude.

2. The ornamental device of claim 1 having five point members forming a five-pointed star.

3. The ornamental device of claim 1 wherein said flat strap material has a thickness ranging from about one-sixteenth to about one-eight inch and a width ranging from about one-half to about one inch.

* * * * *